United States Patent [19]
Kopec

[11] Patent Number: 5,477,819
[45] Date of Patent: Dec. 26, 1995

[54] INTEGRATED AIR INTAKE SYSTEM

[75] Inventor: Eduard Kopec, Bietigheim-Bissingen, Germany

[73] Assignee: Filterwerk Mann & Hummel GmbH, Ludwigsburg, Germany

[21] Appl. No.: 378,377

[22] Filed: Jan. 25, 1995

[30] Foreign Application Priority Data

Jan. 25, 1994 [DE] Germany ............................ 44 02 048.1

[51] Int. Cl.⁶ .................................................. F02M 35/10
[52] U.S. Cl. ................................ 123/184.42; 123/184.57; 123/184.61
[58] Field of Search ........................ 123/184.61, 184.57, 123/184.21, 184.42

[56] References Cited

U.S. PATENT DOCUMENTS

| | | | |
|---|---|---|---|
| 4,111,163 | 9/1978 | Ederer et al. | 123/184.61 |
| 4,300,511 | 11/1981 | Lang | 123/573 |
| 4,301,775 | 11/1981 | Smart et al. | 123/184.61 |
| 4,497,287 | 2/1985 | Schleiermacher et al. | 123/184.61 |
| 4,776,313 | 10/1988 | Freismuth et al. | 123/184.42 |
| 5,003,933 | 4/1991 | Rush, II et al. | 123/519 R |
| 5,243,933 | 9/1993 | Mukawa | 123/184.61 |
| 5,273,010 | 12/1993 | Elder | 123/184.21 |

FOREIGN PATENT DOCUMENTS

| | | | |
|---|---|---|---|
| 0065064 | 11/1982 | European Pat. Off. | 123/184.61 |
| 365016 | 4/1990 | European Pat. Off. | |
| 523027 | 1/1993 | European Pat. Off. | |
| 2690376 | 10/1993 | France | |
| 2214373 | 10/1973 | Germany | 123/184.61 |
| 3606300 | 9/1987 | Germany | |
| 58-162724 | 9/1983 | Japan | 123/184.61 |
| 60-119360 | 6/1985 | Japan | 123/184.61 |
| 2-181063 | 7/1990 | Japan | 123/184.61 |
| WO90-09520 | 8/1990 | WIPO | |

OTHER PUBLICATIONS

"Equipments de véhicules", *Revue Technique Automobile*, vol. 48, No. 555, p. LX, XP 000411585, Oct., 1993.

*Primary Examiner*—David A. Okonsky
*Attorney, Agent, or Firm*—Evenson, McKeown, Edwards & Lenahan

[57] ABSTRACT

An integrated air intake system, particularly for the combustion air of an internal-combustion engine, which comprises a plastic housing (10), an air intake manifold, an air filter (21) and at least one additional electric and/or mechanical component. The housing is constructed of a plurality of shells and is formed with a bottom part (37) and a top part (38) divided by a parting plane extending along the intake manifold (23). The air filter is arranged in an unfiltered air chamber in the top part, and a cover (12) on the top part closes off the unfiltered air chamber and secures the air filter therein.

7 Claims, 3 Drawing Sheets

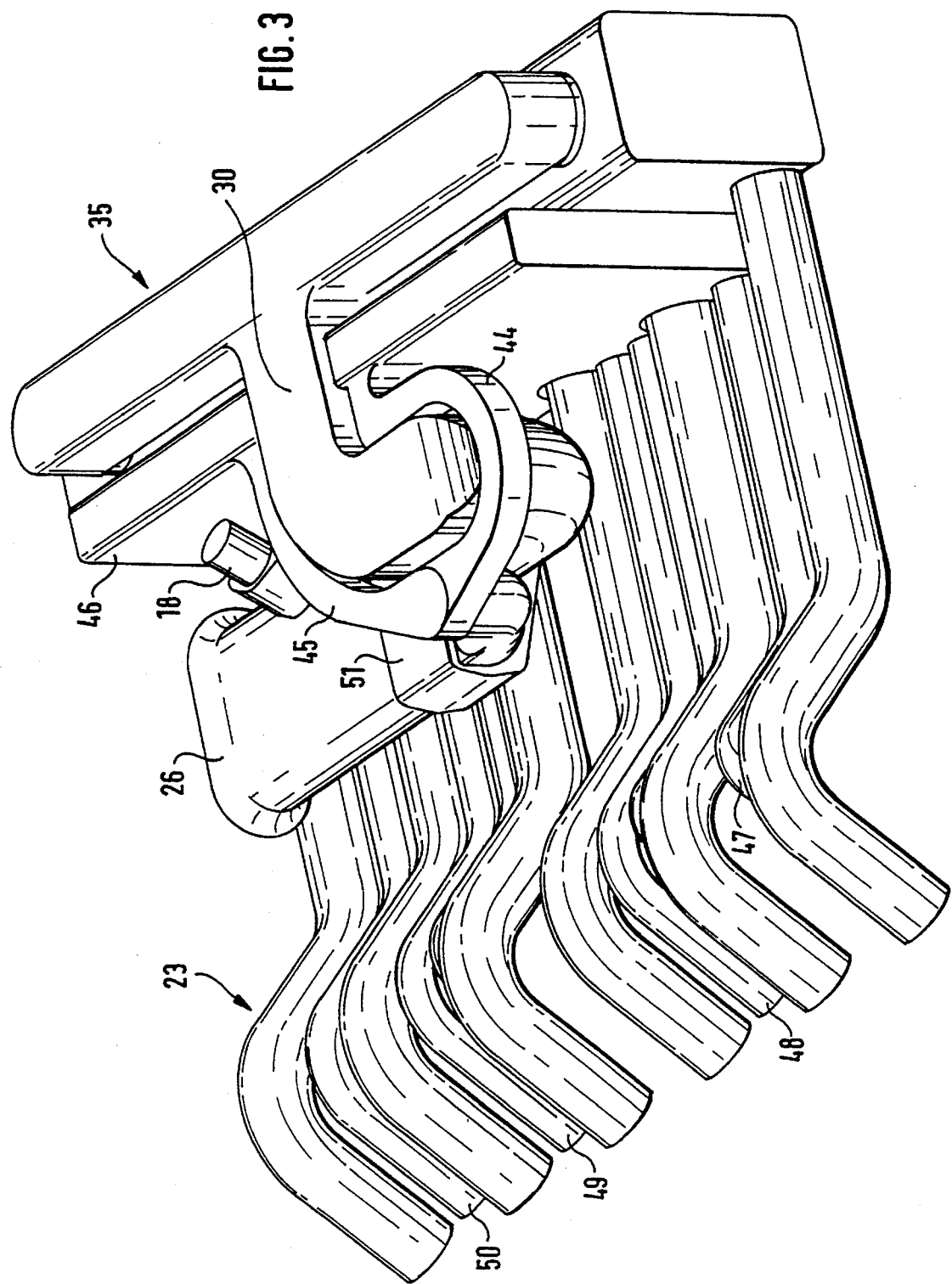

INTEGRATED AIR INTAKE SYSTEM

BACKGROUND OF THE INVENTION

This invention relates to an integrated air intake system, particularly for the combustion air of an internal combustion engine, comprising a plastic housing, an air intake manifold, an air filter and at least one additional electric and/or mechanical component.

It is known to manufacture complete air intake systems with all of the components, ranging from the air filter to the fuel injection valves, which are important for conditioning the intake air for an internal combustion engine. Such air intake systems comprise a plurality of components, such as the intake manifold, the throttle valve, the idle air regulator, the fuel distributor, the injection valves, the temperature sensor, etc.

Thus, for example, a system from the firm Siemens AG is known in which the various components are flanged to or arranged on a plastic support. The plastic support is constructed as an intake manifold. One disadvantage of this known system is that, although the several components are combined in one system, the system is very complex and costly to manufacture, particularly because of the number of components. In addition it has to be equipped with a large number of mechanical as well as electrical connecting elements.

It is also known to manufacture plastic intake manifolds by the so-called core melting process. The characteristic feature of this process is the injection of plastic material around a metal core whose melting point is lower than that of the plastic material. By melting out the core, an intake manifold can be manufactured in a single molding step and can largely have any shape while maintaining a high degree of dimensional stability and good surface characteristics. However, in the core melting technique it is either not possible to integrate additional components or mechanical or electrical components in the intake manifold or it is only possible to do so at high cost.

SUMMARY OF THE INVENTION

It is the object of this invention to provide an air intake system, particularly for combustion air of an internal combustion engine, which includes a plurality of components and yet is simple to manufacture.

These and other objects of the invention are achieved by providing an integrated air intake system for combustion air for an internal-combustion engine comprising a plastic housing, an air intake manifold, an air filter and at least one other electric or mechanical component, in which the housing is constructed of multiple shells and comprises a top part and a bottom part divided by a parting plane extending along an intake manifold, an air filter is arranged in an unfiltered air chamber in the top part, and a cover member is attached to the intake system to close off the unfiltered air chamber and secure the air filter in the unfiltered air chamber.

The principal advantage of the invention is the use of the multi-shell technique. In this technique, several component parts are injection molded and together form the finished product when connected by welding one with another.

The air intake system of the invention comprises a lower part and an upper part which are separated by a parting plane which extends along the intake manifold. As a result, complicated structures can also be manufactured in a simple manner by injection molding, and—this is the decisive advantage of the invention—, mechanical or electrical or electronic components may be included during the assembly or joining of the individual parts or shells.

One embodiment of the invention envisions that the upper part of the housing is equipped with another intermediate housing, the two parts being connected by welding. Vibration welding has been found to be suitable as a welding process. By means of the arrangement of the intermediate housing, air guide ducts can be formed or additional components can be connected with the air intake system.

According to a further embodiment of the invention, an oil separator for the crankcase ventilation is integrated in the bottom part of the housing. While, up to now, it has been customary to arrange an oil separator as a separate plastic component on the engine, it is now possible to include the oil separator in the plastic housing.

In accordance with a further embodiment of the invention, a resonance system can be constructed in the air intake system in a simple manner. For this purpose, two air conducting systems are required which may be connected to or disconnected from each other by means of a resonance flap.

Likewise switchable intake ducts may be produced with the air intake system according to the invention in which the lengths of the intake ducts are matched to the rotational speed of the engine by means of appropriate flaps or valves.

In conjunction with flaps in the air guide ducts, the plastics technology of the air intake system facilitates simple optimization of the system.

Thus, for example, in a six-cylinder engine, in the lower rotational speed range the cylinder bank may be divided by the resonance flap, so that two three-cylinder units with separate intakes are produced which, particularly in the lower rotational speed range, have a more favorable torque behavior. In the high rotational speed range, the resonance flap opens up and permits the optimal utilization of the capacity of the six-cylinder engine.

A further optimization of the torque behavior can be achieved by equipping the air intake system with a turbulence system. This turbulence system comprises an independent turbulence collector and independent turbulence ducts. These extend parallel to the intake ducts and, like the intake ducts, are formed by the upper and lower shells of the housing. The turbulence system becomes operative at low rotational speeds of the engine; that is, in this rotational speed range the intake air of the engine is supplied exclusively through the turbulence system which, because of its smaller cross-section, results in better swirling of the intake air and therefore in better carburation or fuel/air mixture formation.

In accordance with another embodiment of the invention, the air intake system may be equipped with a number of components, such as a hot-film air mass sensor, fuel injection valves and a fuel control strip or fuel distribution strip. Likewise, the throttle valve may be integrated into the system. The integration of the system has the advantage that all connecting lines, including both the electrical connections as well as the connecting lines for the fuel, can each be connected with the peripheral engine components by means of a single plug contact or plug connection.

These and other features of preferred embodiments of the invention, in addition to being recited in the claims, are also disclosed in the specification and/or the drawings, and the individual features may each be implemented in embodiments of the invention either individually or in the form of subcombinations of two or more features and/or may be applied to other fields of use and may constitute advantageous, separately protectable embodiments for which protection is also claimed.

BRIEF DESCRIPTION OF THE DRAWINGS

The invention will be explained hereinafter in further detail with reference to illustrative preferred embodiments depicted in the accompanying drawings in which:

FIG. 3 is a schematic representation of the air intake system.

DETAILED DESCRIPTION OF PREFERRED EMBODIMENTS

Figure 1:
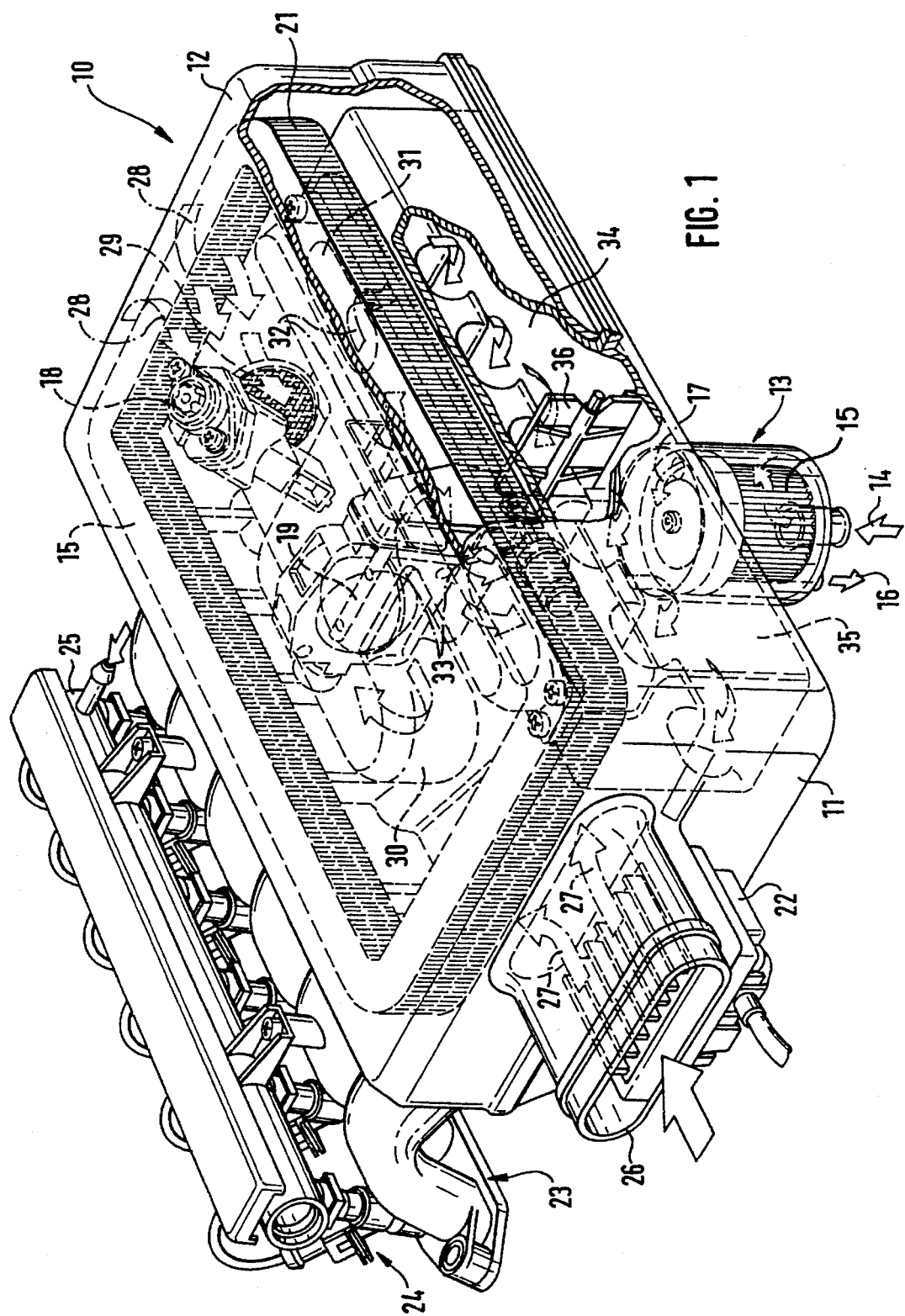
FIG. 1 is a partially cut away view of an integrated air intake system according to the invention.

The integrated air intake system shown in FIG. 1 comprises all the components which are needed for producing and conditioning the fuel mixture, ranging from the supply duct for the intake air to the injection valves of the internal combustion engine. The air intake system comprises a plastic housing 10 which has a base body 11 on which a cover 12 is releasably fastened, for example, by means of clamps. Among other components, the housing 10 contains an oil separator 13 to which the blow-by gases of the internal-combustion engines are supplied as shown by arrow 14. The blow-by gases are cleansed in the oil separator 13 by means of a filter element 15o The oil flows in the direction of the arrow 16 back into the oil pan while the cleaned gases are mixed with the intake air as indicated by arrow 17.

An air mass sensor 18 is also provided as well as a throttle device 19. Air mass sensor 18 may, for example, be a conventional hot-film air mass sensor. Furthermore, a resonance flap 36 is arranged in the base body 11 as well as an air filter element in the form of a rectangular filter 21. On the base body there is an electrical connector strip 22 through which all of the individual components are controlled and through which sensor signals also may be tapped in order to monitor the operation of the various components of the system. Intake manifold pipes 23 are connected to the base body. These intake manifold pipes 23 are equipped with injection valves 24. The fuel injection valves 24 are supplied with fuel through a fuel distribution strip 25. The intake air flows through the intake duct connector stub 26 into the housing as shown by arrows 27, where it arrives in the unfiltered air chamber and then flows through the filter element 21 as shown by arrows 28. The filtered air flows through a sieve 29 and passes through the air mass sensor 18 to the throttle device 19. When the throttle flap is opened, the air flows through the air guide channel 30 and from thence passes into the transverse distributor 31. As indicated by arrows 32 and 33, the air flows into both of the two resonance chambers 34, 35. The resonance chambers are separated by the resonance flap 36. At high rpm, the resonance flap is opened and connects both chambers in order to improve the torque performance. From the resonance chambers 34, 35, the air flows through the intake manifold pipes 23 to the intake valves of the internal combustion engine (not shown).

Figure 2:
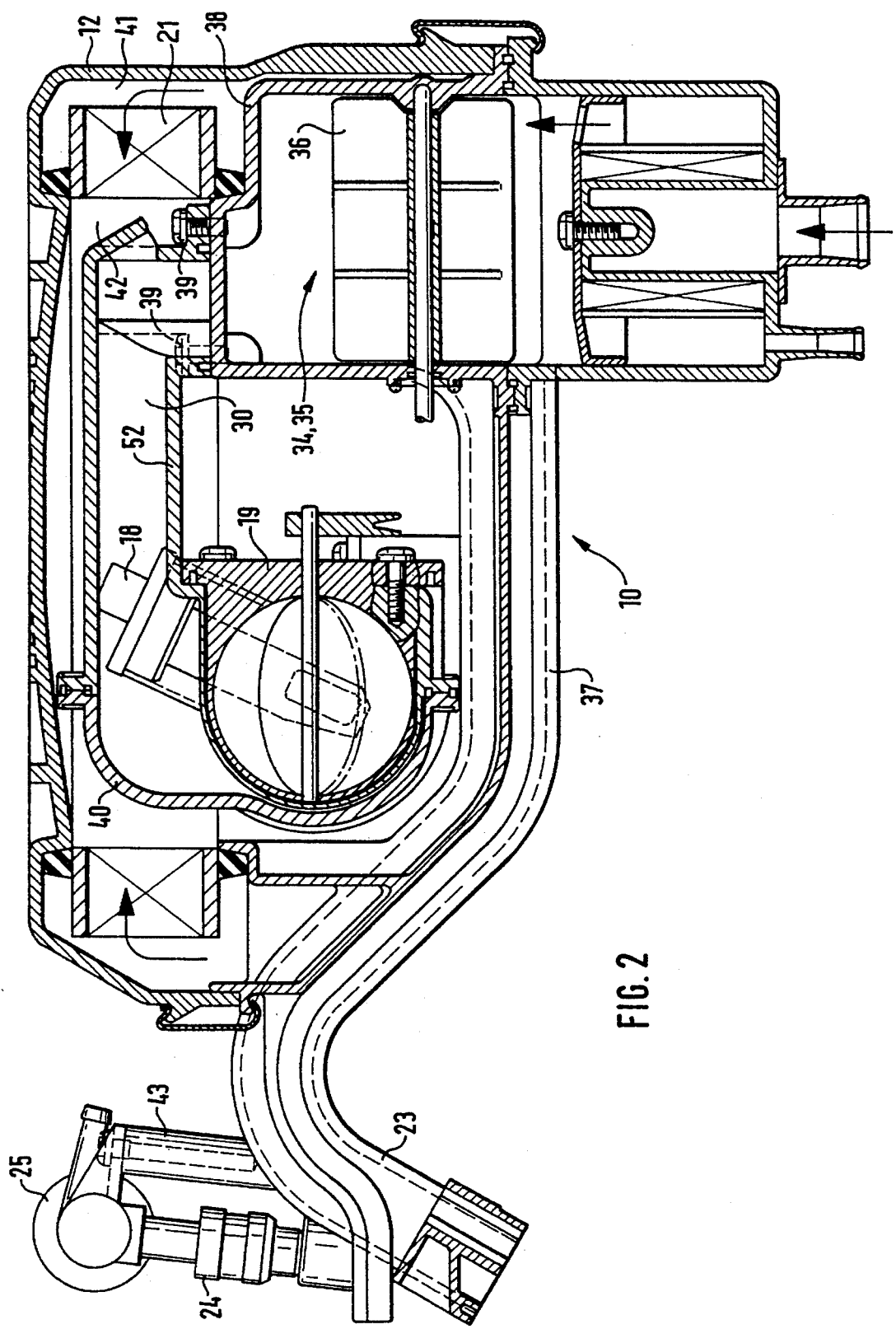
FIG. 2 is a sectional view of the air intake system of FIG. 1.

FIG. 2 is a sectional view showing the construction of the housing 10. The base body 11 of the plastic housing 10 comprises a bottom part 37 which also forms the lower half shell of the pipes of the intake manifold 23. This bottom part is welded to the top part 38. The top part forms the upper half shells of the intake manifold pipes 23 and the resonance chambers 34, 35. The resonance flap 36 is arranged as shown in the drawing in the resonance chambers 34, 35, and can be pivoted through an angle of 90 degrees by means of an adjusting mechanism, which is not shown in the drawing. The air guide channel 30 is attached to the upper part by connecting screws. The air guide channel 30 is provided with a cover 40. This cover may advantageously be attached to the channel 30 by a welded connection. The throttle device 19 and the air mass sensor 18, which is shown here only diagrammatically, are integrated in the air guide channel 30. The filter element is situated between the cover 12 and the top part 38 of the housing and forms a filter seal between the unfiltered air chamber 41 and the clean air chamber 42. Fastening elements 43 are arranged on the intake manifold pipes 23. These fastening elements 43 carry the fuel distribution strip 25 which supplies the injection valves 24 with fuel.

FIG. 2 also shows an intermediate housing part 52 which is assembled together in a multi-shell composite assembly with the upper shell top part 38 of base body 11, for example, by welding. Together with the top part 38 of base body 11, intermediate housing part 52 forms a portion of the air guide channel through the integrated air intake system.

FIG. 3 is a diagrammatic representation of an air intake system according to the invention with an integrated turbulence system. In order to optimize the combustion process, particularly when the internal combustion engine is operating at low rotational speeds, it is necessary that the supplied intake air be sufficiently intermixed with the fuel. This is best achieved by means of high air speeds. In order to attain these high air speeds, a so-called turbulence system may be integrated in the air intake system. This is basically a reduced size air intake system which corresponds to the air intake system as far as its method of operation is concerned, but which generates higher air speeds because of its smaller duct cross-sections. FIG. 3 shows the air intake duct connector stub 26 with the air mass sensor 18 and the air guide channel 30 which is followed by the two resonance chambers 34, 35 and the intake manifold pipes 23.

From the air intake connection stub, the required air is conducted through air guide channels 44, 45 to a turbulence collector 46. Six turbulence ducts (ducts 47, 48, 49, 50 are visible) branch off from this turbulence collector 46. These turbulence ducts extend parallel to the intake manifold pipes 23 and open in the area of the intake valves into the intake passage of the cylinder head of the internal combustion engine. In this system, the throttle valve, which is not shown in this figure, is constructed as a register throttle valve 51 which at low rotational speeds initially opens up the turbulence system and only opens the main system starting at higher rotational speeds. Naturally, the turbulence ducts are also constructed by the two-shell technique. This means that the lower half shells of the turbulence ducts adjoin the lower half shells of the intake manifold pipes while the upper half shells adjoin the upper half shells of the intake manifold pipes, and the half shells are all welded together in a common welding operation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An integrated air intake system for combustion air for an internal combustion engine comprising a plastic housing, an air intake manifold, an air filter and at least one other electric or mechanical component, wherein said housing is constructed of multiple shells and comprises a top part and a bottom part divided by a parting plane extending along the intake manifold, said air filter is arranged in an unfiltered air chamber in said top part, and a cover member is attached to said intake system to close off said unfiltered air chamber and secure said air filter in said unfiltered air chamber; said air intake system further comprising an intermediate housing part arranged in a welded composite assembly with one of said top and bottom housing parts such that said intermediate housing part and said one of said housing parts together form between them a portion of an intake air guide channel.

2. An integrated air intake system according to claim 1, wherein said intermediate housing part is arranged in a welded composite assembly with said housing top part such that said intermediate housing part and said housing top part together form between them a portion of said intake air guide channel.

3. An integrated air intake system according to claim 1, wherein said housing bottom part comprises an oil separator for a crankcase ventilation system.

4. An integrated air intake system for combustion air for an internal combustion engine comprising a plastic housings an air intake manifold, an air filter and at least one other electric or mechanical component, wherein said housing is constructed of multiple shells and comprises a top part and a bottom part divided by a parting plane extending along the intake manifold, said air filter is arranged in an unfiltered air chamber in said top part, a cover member is attached to said intake system to close off said unfiltered air chamber and secure said air filter in said unfiltered air chamber, and a resonance system is arranged in said housing, said resonance system comprising a resonance flap and two air conducting systems, said resonance flap connecting said two air conducting systems.

5. An integrated air intake system for combustion air for an internal combustion engine comprising a plastic housing, an air intake manifold, an air filter and at least one other electric or mechanical component, wherein said housing is constructed of multiple shells and comprises a top part and a bottom part divided by a parting plane extending along the intake manifold, said air filter is arranged in an unfiltered air chamber in said top part, and a cover member is attached to said intake system to close off said unfiltered air chamber and secure said air filter in said unfiltered air chamber, said integrated air intake system further comprising a turbulence system which comprises a turbulence collector and a plurality of turbulence ducts each leading to a respective intake valve of the internal combustion engine, wherein said turbulence ducts are formed by said top part and said bottom part of said housing and extend substantially parallel to pipes of said intake manifold.

6. An integrated air intake system according to claim 5, further comprising a hot-film air mass sensor integrated in said housing where it can measure the mass of air flowing to said filter, and wherein said intake manifold comprises a flange portion having a fuel distribution strip and a plurality of fuel injector valves integrated therein.

7. An integrated air intake system according to claim 1, having a throttle valve arranged therein, and wherein all components arranged in the system can be electrically controlled through a single plug strip, said plug strip further comprising means for tapping sensor signals for monitoring the operation of the components of the system.

\* \* \* \* \*